United States Patent
Itou et al.

(10) Patent No.: US 9,063,384 B2
(45) Date of Patent: Jun. 23, 2015

(54) LIQUID CRYSTAL DISPLAY DEVICE

(71) Applicant: Japan Display Inc., Tokyo (JP)

(72) Inventors: Osamu Itou, Hitachi (JP); Takato Hiratsuka, Chiba (JP)

(73) Assignee: Japan Display Inc., Tokyo (JP)

( * ) Notice: Subject to any disclaimer, the term of this patent is extended or adjusted under 35 U.S.C. 154(b) by 85 days.

(21) Appl. No.: 13/925,709

(22) Filed: Jun. 24, 2013

(65) Prior Publication Data

US 2013/0342778 A1    Dec. 26, 2013

(30) Foreign Application Priority Data

Jun. 26, 2012  (JP) ................................. 2012-143178

(51) Int. Cl.
*G02F 1/1339* (2006.01)
*G02F 1/1343* (2006.01)
*G02F 1/1333* (2006.01)

(52) U.S. Cl.
CPC .... *G02F 1/134363* (2013.01); *G02F 1/133377* (2013.01)

(58) Field of Classification Search
CPC .................. G02F 1/134363; G02F 1/133377; G02F 1/13331; G02F 1/134336; G02F 1/1394; G02F 1/133707
USPC ............ 349/42, 156, 159, 141, 143, 129, 41, 349/43, 155, 142; 257/59, 72
See application file for complete search history.

(56) References Cited

U.S. PATENT DOCUMENTS

| | | | |
|---|---|---|---|
| 6,433,582 B2 | 8/2002 | Hirano | |
| 6,433,852 B1 | 8/2002 | Sonoda et al. | |
| 7,675,596 B2 * | 3/2010 | Hirota et al. | 349/134 |
| 8,031,313 B2 * | 10/2011 | Suzuki | 349/144 |
| 2002/0036743 A1 * | 3/2002 | Youn et al. | 349/141 |
| 2006/0290869 A1 * | 12/2006 | Suzuki | 349/143 |
| 2009/0284707 A1 * | 11/2009 | Cho et al. | 349/160 |
| 2010/0302492 A1 * | 12/2010 | Kubota et al. | 349/138 |
| 2011/0128491 A1 * | 6/2011 | Kubota et al. | 349/139 |
| 2013/0265534 A1 * | 10/2013 | Hiratsuka et al. | 349/139 |

FOREIGN PATENT DOCUMENTS

| | | |
|---|---|---|
| JP | 10-307292 | 11/1998 |
| JP | 2000199904 A | 7/2000 |

* cited by examiner

*Primary Examiner* — Edward Glick
*Assistant Examiner* — Shan Liu
(74) *Attorney, Agent, or Firm* — Ulmer & Berne LLP

(57) ABSTRACT

A wall electrode IPS mode LCD has stabilized domain boundary. Signal and scanning lines extend in first and second directions, respectively, surrounding a pixel. A first wall structure has a first portion intersecting the first direction at a first angle, a second portion in the first direction, and a third portion intersecting the first direction at a second angle. The second portion has a first projection in the second direction. The second wall structure has a fourth portion intersecting the first direction at the first angle, a fifth portion in the first direction, and a sixth portion intersecting the first direction at the second angle. The fifth portion has a second projection in the second direction. A distance between the first projection and the fifth portion is shorter than a distance between the first wall structure except the first projection and the second wall structure.

8 Claims, 15 Drawing Sheets

FIG. 5A
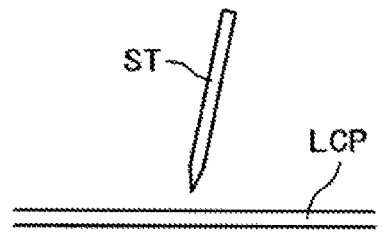
FIG. 5B
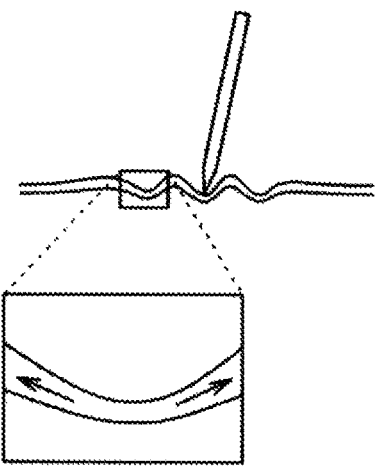
FIG. 5C
FIG. 5D
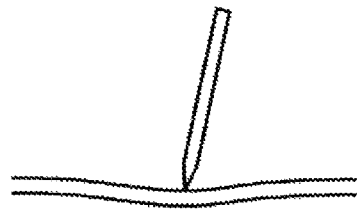

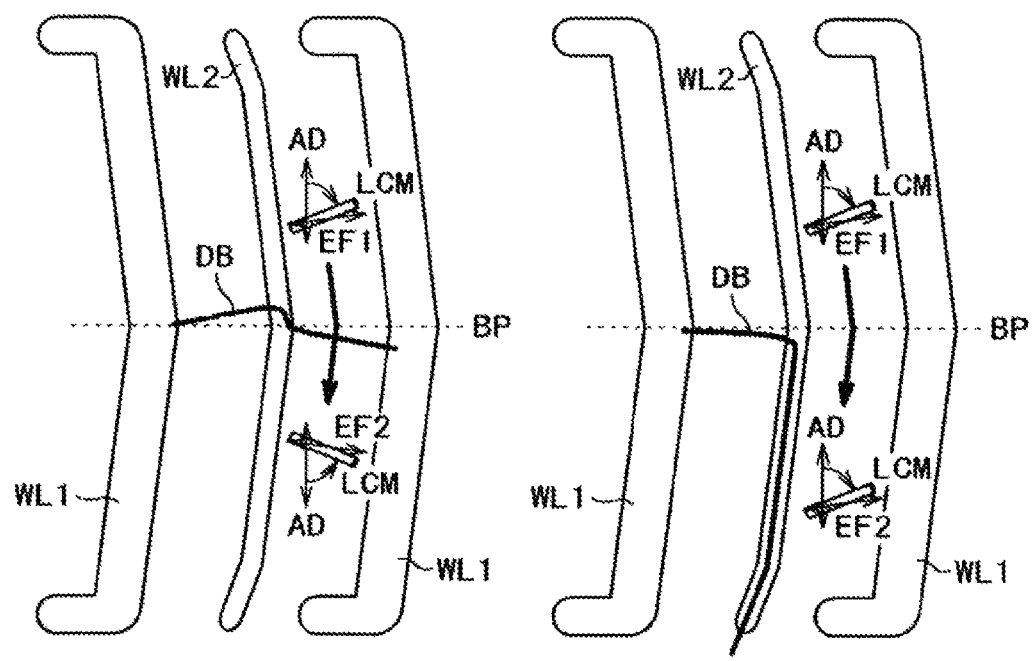

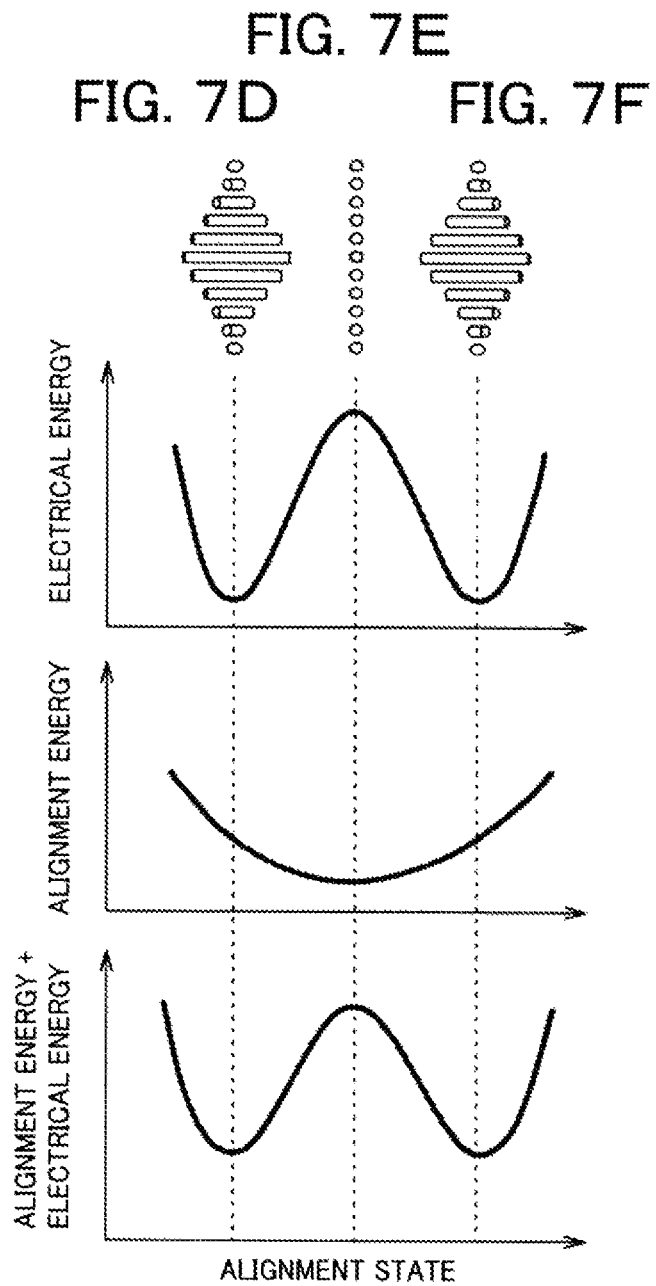

LIQUID CRYSTAL DISPLAY DEVICE

CLAIM OF PRIORITY

The present application claims priority front Japanese Patent Application JP 2012-143178 filed on Jun. 26, 2012, the content of which is hereby incorporated by reference into this application.

FIELD OF THE INVENTION

The present invention relates to a display device, in particular, to an IPS mode liquid crystal display device having wall electrodes to achieve excellent viewing angle characteristics and a high definition screen.

BACKGROUND OF THE INVENTION

A liquid crystal display device panel used for a liquid crystal display device has a TFT substrate and an opposed substrate. The TFT substrate has pixels in a matrix manner. Each pixel has, for example, a pixel electrode and a thin-film transistor (TFT). The opposed substrate opposes the TFT substrate and has, for example, color filters correspondingly to the pixel electrodes of the TFT substrate. Liquid crystal is sandwiched between the TFT substrate and opposed substrate. Images are formed by controlling a light transmission of each pixel by liquid crystal molecules.

Liquid crystal display devices, which are flat and lightweight, are being widely used in various fields. Compact liquid crystal display devices are widely used for, e.g., mobile phones and digital still cameras (DSC). Viewing angle characteristics of liquid crystal display devices is a disadvantage. In the viewing angle characteristics, brightness and chromaticity of a screen change between when viewed from the front and when viewed obliquely. The in-plane switching (IPS) mode that operates liquid crystal molecules by use of a parallel electric field is excellent in viewing angle characteristics.

Even in the IPS mode, when each pixel is small in a high definition screen, the transmission and screen brightness cause a disadvantage. On the other hand, a wall electrode in-plane-switching liquid crystal display (IPS-LCD) applies an electric field to a liquid crystal layer by use of electrodes formed on wall surfaces of wall structures projecting in the liquid crystal layer. The wall electrode IPS-LCD is capable of applying a more parallel electrical field to the liquid crystal layer to achieve a higher transmission in comparison to the related IPS-LCD using flat electrodes.

Japanese Patent Application Laid-open Publication No. 2000-199904 discloses a columnar spacer optimized to the IPS mode in a liquid crystal display device in view of parasitic capacitance reduction. Japanese Patent Application Laid-Open Publication No. H10-307292 discloses a structure that bridges bends of two electrodes, but does not disclose a structure that places the shortest portions between electrodes to one place. This concept is different from that of the present invention.

SUMMARY OF THE INVENTION

A wall structure in the wall electrode IPS mode is placed under a black matrix of a pixel, boundary. Accordingly, a change of an alignment of a liquid crystal layer is constant even when a width of a pixel is reduced due to high definition. A display mode efficiency of the wall electrode IPS-LCD is constant regardless of high definition. Here, the display mode efficiency is a transmission normalized by a substrate transmission.

To improve viewing angle characteristics of an IPS-LCD, the multi-domain structure that forms two small areas having different rotation directions of liquid crystal directors at voltage application, i.e., domains, in one pixel has been devised. This is effective also for improvement in viewing angle characteristics of the wall electrode IPS-LCD. To address one issue of the multi-domain structure of the wall electrode IPS-LCD, pushed-domain reduction may be necessary. It takes time for the pushed domain to disappear after application of the pressing force, which causes a short-time image lag. The pushed domain is caused by movement of a domain boundary at application of a pressing force. Reduction of the pushed domain may need stabilization of the domain boundary by optimizing a pixel structure.

The pushed domain in the multi-domain structure is a disadvantage also in the related IPS-LCDs. A pixel structure that reduces the pushed domain has been proposed. However, the wall electrode IPS-LCD has a different electric field from that of the related IPS-LCD. As a result, even when, the pixel structure effective for domain boundary stabilization m the related IPS-LCD is used in the wall electrode IPS-LCD, the same effect is not obtainable. That is, in the related IPS-LCD, spacing between a common electrode and source electrode is short, and an electric field is localized at the substrate interface and has a high field strength. This is remarkable especially in an IPS-Pro (Provectus)-LCD that applies an electric field between a comb-like electrode and solid planar electrode stacked across an insulating layer. On the other hand, in the wall electrode IPS-LCD, the spacing between the common electrode and source electrode is long, the electric field is widely distributed in the liquid crystal layer, and the field strength is weak.

In a multi-domain structure of a wall electrode IPS-LCD, it is desirable to prevent instability of a domain, boundary and thus to prevent a short-time image lag, brightness unevenness, and the like due to the domain in boundary.

At a domain boundary, a portion where the spacing between a common electrode and a source electrode is shortest is generated only in one location. Specifically, a multi-domain structure includes two domains respectively having alignment directions angled relative to a wall structure extension direction and reversed to one another. A parallel portion where the wall structure extension direction is in parallel to the alignment directions is placed to a boundary between the two domains. Additionally, a projection is provided to the generally center of the parallel portion. Main specific procedures are as follows.

A liquid crystal display device has liquid crystal sandwiched between a first substrate having source electrodes, common electrodes, TFTs, and color filters and a second substrate. Each pixel of the first substrate is defined by a video signal line extending in a first direction and a scanning signal line that extends in a second direction. In the pixel, a first wall structure and a second wall structure are formed to oppositely to one another. A third wall structure is formed between the first wall structure and second wall structure. The first wall structure and the second wall structure have the same height and are higher than, the third wall structure. The first wall structure, the second wall, structure, and the third wall structure are covered with the common electrode. The common electrode is covered with a first insulating layer. The source electrode is formed on the first insulating layer on the sides of the first wall structure, second wall structure, and third wall structure. The first wall structure has a first portion that intersects the first direction at a first angle θ, a second portion extending in the same direction as the first direction, and a third portion that intersects the first direction at a second angle (180 degrees−θ). The second portion has a first projection in a direction of the third wall structure. The third wall structure has a fourth portion that intersects the first direction at the first angle θ, a fifth portion that extends in the same direction as the first direction, and a sixth portion, that intersects the first direction at the second angle (180 degrees−θ). The fifth portion has a second projection in the same direction as the projecting direction of the first projection. A distance between the first projection and the fifth portion of the third wall structure is shorter than a distance between the second portion of the first wall structure except the first projection and the third wall structure.

To the present invention, the shortest portion between a common electrode and a source electrode at a bending portion is disposed to one location to stabilize a domain boundary. As a result, a short image lag due to a pressing force can be reduced.

With the spread of smart phones, touch panel manipulations have been popular. Pressing forces are applied on a display panel at touch panel manipulations. On the other hand, organic electro-luminescence displays start spreading in smart phones and digital cameras and have no short image lag, which is one of advantages over LCDs. As mentioned above, a solution to the snort image lags due to pressing forces may be necessary for middle or small LCDs. In the present invention, there is an advantage that a wall electrode IPS-LCD can be practically used with a touch panel.

The present invention is directed particularly for smart phones in which touch panel manipulations are popular, tablet PCs in which touch panel manipulations are popular and high resolution is improving, etc.

BRIEF DESCRIPTION OF THE DRAWINGS

FIGS. 5A, 5B, 5C, and 5D are cross sectional views showing influence on a liquid crystal display panel in a touch panel manipulation;
FIGS. 6A and 6B are schematic diagrams showing comparison of movements of domains;
FIGS. 7A, 7B, 7C, 7D, 7E, and 7F show graphs showing relationship among alignments of liquid crystal, electrical energy, and alignment energy.

DETAILED DESCRIPTION OF THE EMBODIMENTS

At a domain boundary, since a liquid crystal layer alignment changes rapidly and alignment energy is nigh, the domain boundary is formed to be shortest. In a wall electrode IPS-LCD, domains are formed to connect a common electrode and a source electrode, which are placed away from one another by a distance of about a half of a pixel width. As mentioned above, in the multi-domain pixel, structure of the wall electrode IPS-LCD, the domain boundary is formed to a portion where the spacing between the electrodes is shortest. Here, the domain, boundary is unstable when similar electrode spacing is distributed widely or there are two or more portions where the spacing between the electrodes is shortest. In this case, the domain boundary moves easily by a pressing force to cause a short-time image lag.

For example, a multi-domain pixel structure of the related IPS-LCD is assumed to be applied to a wall electrode IPS-LCD. That is, wall electrodes have V-shaped plan structures, the bend portion of which is at a domain boundary. In this case, even when, an acute angle is provided on a mask, the bends become roundish at manufacture. The electrode spacing is similar near the bend portion. The domain, boundary is unstable because alignment energy changes little even when the domain boundary is in any location near the bend portion.

Alternatively, in the related IPS-LCD, a multi-domain pixel structure having a double V-shaped structure may be used. In this case, a dark line forming a domain boundary is thinned, and thus a transmission advantageously increases. However, two shortest portions are generated near the bend portion when the multi-domain pixel structure is applied to the wall electrode IPS-LCD. Also in this case, the domain boundary is unstable. Additionally, the structure in which a projection, is placed to a bend portion of a V-shaped plan structure has been proposed for the related IPS-LCDs. Two shortest portions also are generated near the bend portion when this structure is applied to the wall electrode IPS-LCD. As a result, the domain boundary is unstable.

In the present invention, to stabilize a domain, boundary of a wall electrode IPS-LCD, a shortest portion is generated in only one location at a domain, boundary. Specifically, a parallel portion where a wall structure extension direction is parallel to an alignment direction are placed to the bend portion of the V-shaped structure. Moreover, one projection is provided to the generally center of the parallel portion. Since one parallel portion and the other projection are opposed to one another at a common electrode and source electrode proximal to one another, only the one shortest portion appears. That is, a perpendicular from the projection to the parallel portion is the shortest portion. The domain boundary is formed stably along this shortest portion.

The present invention is explained below in detail by use of Embodiments.

Embodiment 1

Figure 1:
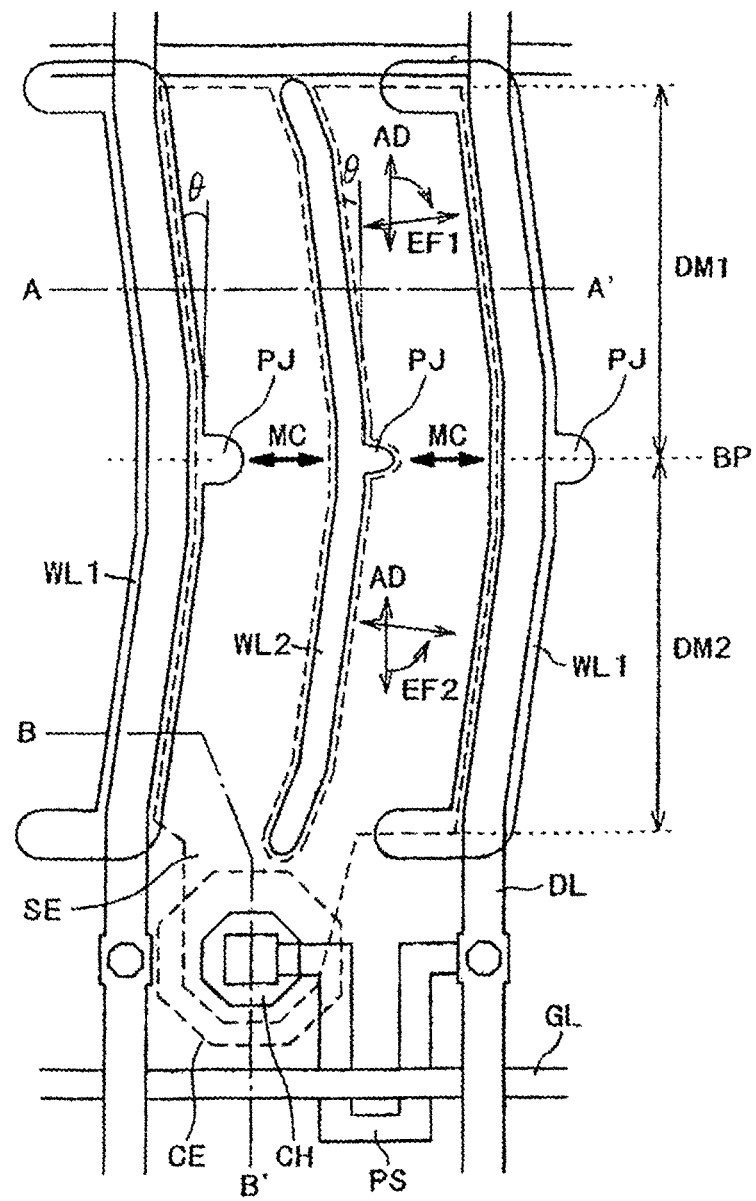
FIG. 1 is a plan view of a pixel in Embodiment 1 of the present invention.
Figure 2:
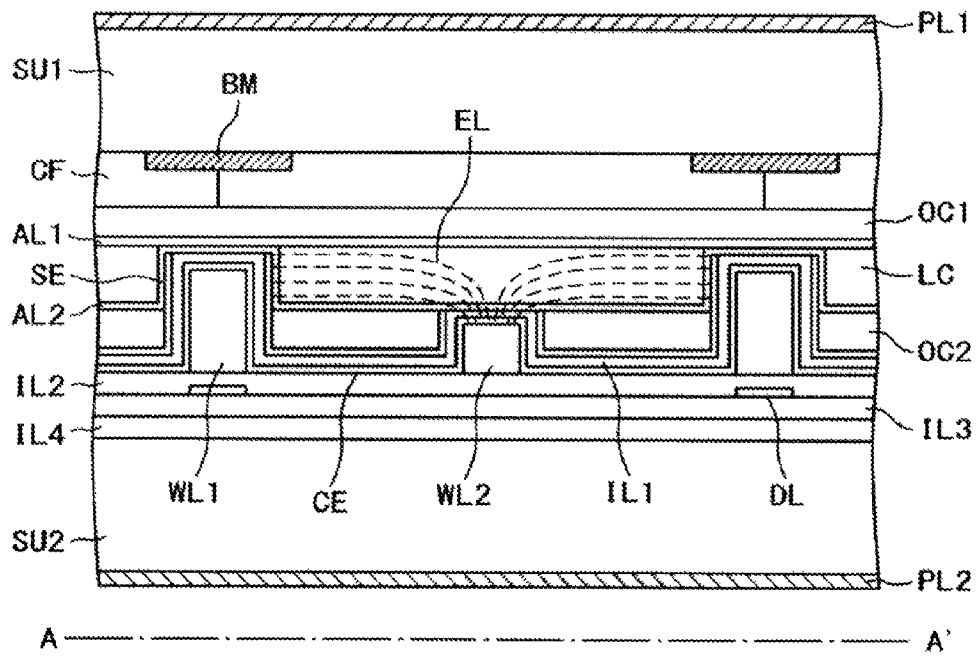
FIG. 2 is a cross sectional view taken along A-A' of FIG. 1.
Figure 3:
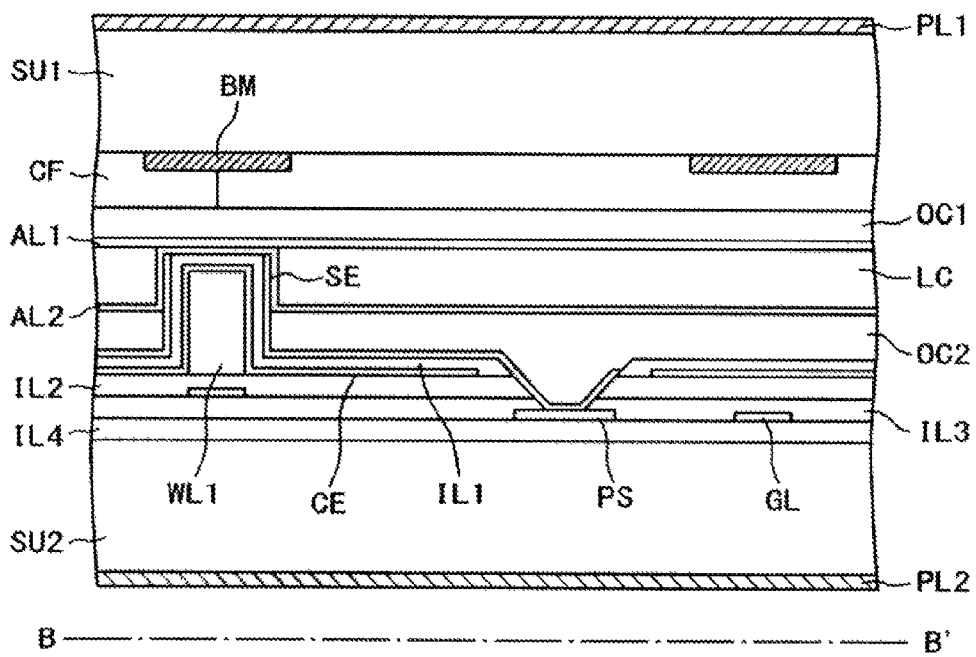
FIG. 3 is a cross sectional view taken along B-B' of FIG. 1.

A plan, view of one pixel of a liquid crystal display device of the present invention is shown in FIG. 1. Cross sectional views thereof are shown in FIG. 2 and FIG. 3. FIG. 2 is the cross sectional view of the central portion of one pixel. FIG. 3 is the cross sectional view of a portion containing a thin film transistor TFT and a contact hole CH. These cross sectional views are respectively taken along AA' and BB' of FIG. 1. A first substrate SU1 and a second substrate SU2 sandwich a liquid crystal layer LC. On the first substrate SU1, a first alignment film AL1, a first planar ration film OC1, a color filter CF, and a black matrix BM are stacked sequentially from the side adjacent the liquid crystal layer LC.

On the second substrate SU2, a second alignment film AL2, a second planarization film OC2, a source electrode SE, a first insulating layer IL1, a cocoon electrode CE, first wall structures WL1 and a second wall structure WL2, a second insulating layer IL2, a signal line DL, a third insulating layer IL3, a scanning line GL, a polysilicon layer PS, and a fourth insulating layer IL4 are provided from the side adjacent the crystal liquid layer LC. In FIG. 1, the outlines of the source electrode SE and common electrode CE are shown by the dashed lines. Since the common electrode CE is distributed in substantially all of the pixel except the contact hole CH, the dashed line showing the outline is distributed only around the contact hole CH.

The first wall structure WL1 is higher than the second wall structure WL2, and projects into the liquid crystal layer LC. The second wall structure WL2 is buried by the second planarization film OC2, and only its top appears on the second planarization film OC2. The common electrode CE is distributed over the first wall structures WL1, the second wall structure WL2, and gaps therebetween. The source electrode SE is distributed on the wall surfaces of she first wall structures WL1, the base of the second wall structure WL2, and the gaps therebetween. The common electrode CE and source electrode SE are stacked across the first insulating layer IL1, and the portion where the electrodes overlap functions as a holding capacity. The common electrode CE is distributed over the first wall structures WL1, the second wall structure WL2, and additionally the gaps therebetween to shield potentials of adjoining pixels and wirings.

The source electrode SE is connected to the signal line DL via the polysilicon, layer PS and contact hole CH to apply a potential to the liquid, crystal layer LC in response to an image signal. The common electrode CE has an opening around the contact hole CH to prevent a short circuit to the source electrode SE. An electric field line EL formed between the source electrode SE and common electrode CE is shown by the dashed lines in FIG. 2. The electric field line EL is distributed to connect, the source electrode SE on the wall surface to the common electrode CE exposed in the center of the pixel. Accordingly, the electric field line EL is distributed substantiality in parallel to the liquid crystal layer LC in the liquid crystal layer LC except on the second wall structure WL2.

The liquid crystal layer LC shows a nematic phase in a wide temperature range including a room temperature. The alignment of the liquid crystal layer LC at no voltage application is a homogeneous alignment. At application of an electric field, a liquid crystal, director changes to rotate within the liquid crystal layer. In comparison with an IPS-LCD using a stripe-like common electrode CE and source electrode SE, a more uniform electric field can be applied to the liquid crystal layer. As a result, higher transmission can be obtained. Since the liquid crystal layer LC is absent at the portion where the first wall structure WL1 is present, the portion where the first wall structure WL1 is present is closed. The first wall structures WL1 are formed mainly on a pixel boundary, and the pixel boundary is shielded by the black matrix BM. Despite the first wall structures WL1, the aperture ratio is not reduced substantially. The first alignment film AL1 and second alignment film AL2 are photo alignment films and use a photo alignment method. The alignment treatment is possible by radiating a polarization ultraviolet light and in a non-contact manner. Therefore, the alignment treatment of the second alignment film AL2 applied on the first wall structures WL1 is possible.

The liquid crystal layer LC at no voltage application is in an alignment direction AD. At voltage application, the alignment direction changes to approach a direction in parallel to the electric field direction. At this time, the alignment state changes to rotate in the liquid crystal layer LC. The rotational direction is clockwise or counterclockwise in plan view, from which one at a smaller rotation angle is selected. In the plan structure of one pixel shown in FIG. 4, the first wall structures WL1 and the second wall structure WL2 bend at a bend portion BP. A domain DM1 is above the bend portion BP. A domain DM2 is below the bend portion BP. An electric field direction EF1 in the first domain DM1 is different from an electric field direction EF2 in the second domain DM2. Therefore, the rotational direction at electric field application is clockwise in the first domain DM1 and counterclockwise in the second domain DM2. As a result, at voltage application, two domains having different alignments of the liquid crystal layer are formed in one pixel.

In the liquid crystal display device of the present invention, the direction of the liquid crystal alignment changes to rotate within the liquid crystal layer at voltage application. When bright display of the liquid crystal display panel is observed in the orientation including the liquid crystal alignment direction, the hue is shifted to the yellow side with increase of the depression angle. The hue is shifted to the blue side in the perpendicular direction to the liquid crystal alignment direction. As described above, two domains having different alignments of the liquid crystal layer are formed in one pixel to observe two domains simultaneously when the liquid crystal display panel is observed, when a hue of one of the two domains shifts to the yellow side, a hue of another side shifts to the blue side. Yellow and blue are complementary colors. A hue closer to white is observed by compensating viewing angle characteristics of the hues. Thus, the first domain DM1 and second domain DM2 are formed in one pixel to improve viewing angle characteristics. On the other hand, stabilization of the boundary between the first domain DM1 and second domain DM2 may be required.

Figure 8:
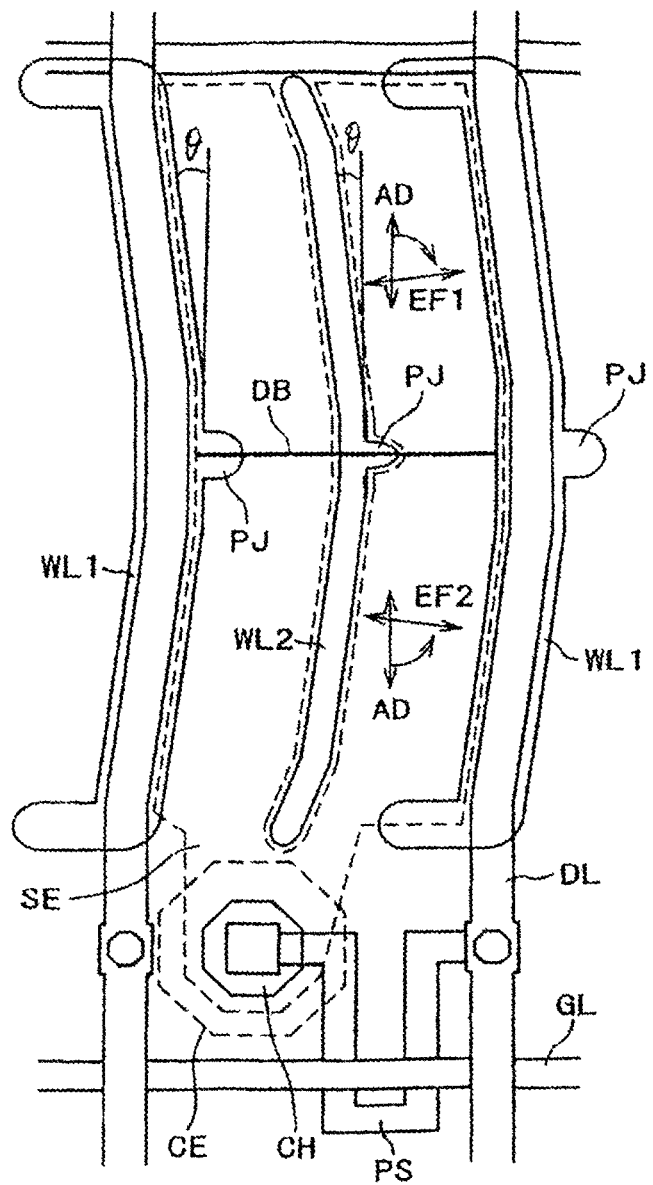
FIG. 8 is a plan view showing operation of Embodiment 2.

When the boundary between the first domain DM1 and second domain DM2 is a domain boundary DB, a clockwise alignment change and a counterclockwise alignment change are antagonistic to one another at the domain boundary DB. Accordingly, even at voltage application, alignment changes are difficult in the liquid crystal layer LC to enter the same alignment state as that at no voltage application. Therefore, the domain boundary DB is observed as a dark line. The electrical energy is large because the alignment direction is close to a perpendicular to the electric field direction near the domain boundary DB. Additionally, since the liquid crystal alignment state changes rapidly, the alignment energy also is high. Thus, the domain boundary DB is unstable. To minimize the electrical energy and alignment energy, a length of the domain boundary DB is tensed to be shortest. Specifically, as shown in FIG. 8, the domain boundary DB is formed to the portion where a distance between each first wall structure WL1 and the second wall structure WL2 is shortest near the bend portion.

Figure 4:
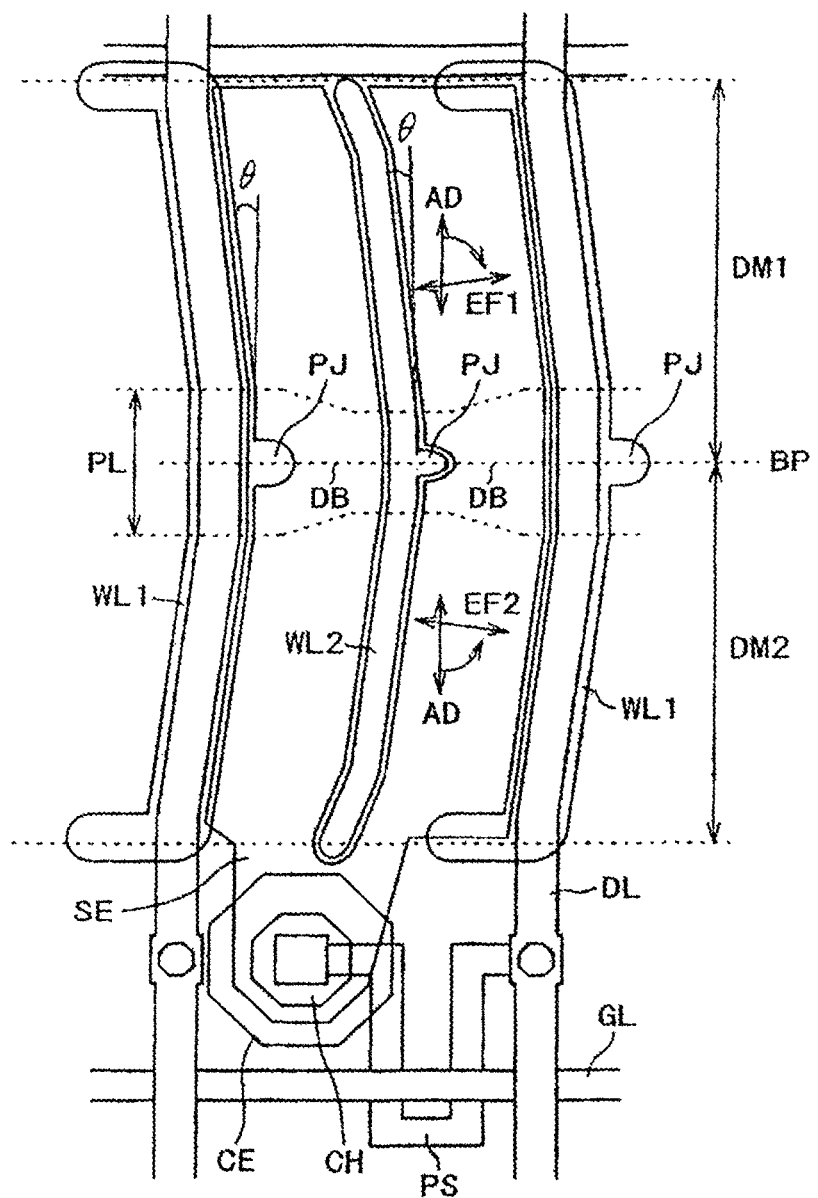
FIG. 4 is a top view of a pixel and shows operations of the present invention.

In the present invention, as shown in FIG. 4, parallel portion PL and projection portions PJ are disposed to the bend portion BP on the first wall, structures WL1 and second wall structure WL2. The parallel portion PL is in parallel to the alignment direction AD. The projection portions PJ are perpendicularly to the parallel portions PL. In one pixel, the projection portion PJ of the first wall structure WL1 is opposed to the parallel portion PL of the second wall structure WL2, and the projection portion PJ of the second wall, structure WL2 is opposed to the parallel portion PL on the first wall structure WL1. By opposing the parallel portion PL on each wall structure to the projection portions PJ, a portion MC where a distance between each first wall structure WL1 and the second wall structure WL2 is shortest is generated only in one location near the bend portion BP as shown in FIG. 1.

Therefore, a position of the domain boundary DB is defined uniquely, and the domain boundary DB is stabilized.

According to the present invention, the domain boundary BB, which is the dark line, can be shortened. Thus, even in the so-called multi-domain pixel structure where the first domain DM1 and the second domain DM2 are formed in one pixel, a high transmission can be obtained.

Embodiment 2

In this embodiment, by applying pressure to the liquid crystal display device of Embodiment 1, it has been observed whether unevenness is viewed from the direction of an increased depression angle. That is, touch panel, manipulations, for example, on smart phones are becoming popular in recent years. Therefore, even in the multi-domain pixel structure, stability of the domain boundary DB is important.

A state in which a liquid crystal display panel LCP having a touch panel is manipulated by use of a stylus ST is schematically shown in FIGS. 5A, 5B, 5C, and 5D. Pressure is applied to the liquid crystal display panel LCP in touch panel manipulations. At this time, the liquid crystal display panel LCP deflects in response to the pressure, as shown in FIG. 5D. Until the liquid crystal display panel LCP reaches the equilibrium state as shown in FIG. 5D, the deflection spreads on the liquid crystal display panel LCP like a wave pattern as shown in FIG. 5B. In this case, the liquid crystal layer thickness is changed. As shown by the arrows in FIG. 5C, which is an enlarged view of FIG. 5B, liquid crystal molecules LCM flow from a portion having the reduced liquid crystal layer thickness to a portion having the increased liquid crystal layer thickness.

The stability of the domain boundary DB is important because the liquid crystal molecules LCM flow and at the same time their alignment state also moves. Now, the domain boundary DE is assumes to be unstable and to move easily. Such an unstable domain boundary DB is provided by, for example, a liquid crystal display device of a comparative example 1. Its pixel plan structure is schematically shown in FIGS. 6A and 6B. FIG. 6 shows only the first walls WL1 and second wall structure WL2 as the pixel structure. As shown by the thick arrows in FIGS. 6A and 6B, the liquid crystal molecules LCM in the first domain DM1 move into the second domain DM2. At this time, when the alignment state changes to a clockwise alignment as shown in FIG. 6A, the liquid crystal alignment does not move following the liquid crystal molecules LCM. Additionally, as shown in FIG. 6A, the domain boundary DB does not move. However, in actual, the liquid crystal molecules LCM in the first domain DM1 more into the second domain DM2 while maintaining the clockwise alignment without changing to the counterclockwise alignment as shown in FIG. 6B. Accordingly, the liquid crystal alignment moves with the liquid crystal molecules LCM. At this time, the domain boundary DB also moves to change its own shape greatly as shown in FIG. 6B.

To explain relationship between the movement and alignment state of the liquid crystal molecules LCM shown in FIG. 6B, relationship between the alignment state and energy is shown in FIG. 7. FIG. 7D shows a clockwise alignment. FIG. 7E shows a homogeneous alignment at no voltage application. FIG. 7F shows a counterclockwise alignment. When the clockwise alignment changes to the counterclockwise alignment, the alignment may need to be a homogeneous alignment at no voltage application once as an intermediate state. However, the alignment state at no voltage application is set to be unstable with increase of electrical energy at voltage application. Specifically, the alignment state at no voltage application is a homogeneous alignment generally perpendicular to the electric field direction. As shown in FIG. 7A, it is difficult to achieve such an alignment state with high electrical energy at voltage application. As shown in FIG. 7C, in the clockwise alignment and counterclockwise alignment, the sum of the alignment energy and electrical energy is very small, and both are separated from one another by an energy barrier. That is, also in the second domain DM2, the clockwise alignment can remain present in a metastable state. From the same reason, even when the liquid crystal molecules aligned counterclockwise in the second domain DM2 move to the first domain DM1, the counterclockwise alignment can be present in the first domain DM1 in a metastable state.

After the alignment state moves by fluidity, an area ratio between the first domain DM1 and second domain DM2 in one pixel deviates from a design value, since the viewing angle characteristics of the first domain DM1 and second domain DM2 are different from each other, the viewing angle characteristics change in the pixels in which the area ratio has changed. Therefore, when the liquid crystal display panel having some pixels in which the area ratio of the first domain DM1 and second domain DM2 has changed is observed from a direction away from the normal direction, the some pixels look uneven.

In the liquid crystal display device of the present invention, by placing the parallel portion PL and projection portions PJ to the bend portion on the first walls WL1 and second wall structure WL2, the port ion MC where the distance between each first wall structure WL1 and the second wall structure WL2 is shortest is disposed only to one location near the bend portion BP. The domain boundary DB itself has high electrical energy and high alignment energy and is unstable. When the location where the domain boundary DB has a shortest length is limited and the length increases rapidly in response to a slight shift from the limited location, the domain boundary DB is secured by itself and stabilized. As shown in FIG. 8, in the liquid crystal display device of this embodiment, the domain boundary DB is present on the bend portion BP stably. Therefore, advantageously, even when pressure is applied to the liquid crystal display panel LCD, the domain boundary DB is less likely to move and unevenness is less likely to generate.

Embodiment 3

The parallel portion PL permits the shortest portion MC to be disposed to one location and thus may need a certain length or more. The parallel portion PL contains the first wall structures WL1 and the second wall structure WL2. On the other hand, the parallel portion PL applies an electric field perpendicular to the liquid crystal alignment direction. In this case, the clockwise alignment change and the counterclockwise alignment change may occur equally. Accordingly, the alignment state at voltage application is unstable. The projections PJ and the wall electrode structure portions not parallel to the alignment direction are present near the parallel portion PL. Therefore, when a length of the parallel portion PL is short sufficiently, the alignment changes generated in the wall electrode structure portions spread to stabilize the alignment state in the parallel portion PL.

The liquid crystal display device of the present invention has been produced. This liquid crystal display device has a changed length of the parallel portion PL. Then, the alignment state and a distribution of the domain boundary DB have been observed in a pixel at voltage application. When the length of the parallel portion PL is equal to or more than the maximum width of each projection portion PJ in the extension direction of the first wall structures WL1, the domain boundary DB has been stabilized sufficiently. When the length of the parallel portion PL is equal to or less than the spacing between she parallel portion PL on each first wall structure WL1 and the parallel portion PL on the second wall, structure WL2, the alignment state in the parallel portion PL has been stabilized sufficiently. As mentioned above, the length of the parallel portion PL may be equal to or more than the maximum width of each projection portion PJ in the extension direction of the first wall structures WL1 and equal to or less than the spacing between the parallel portion PL on each first wall structure WL1 and the parallel portion PL on the second wall structure WL2.

Comparative Example 1

Figure 9:
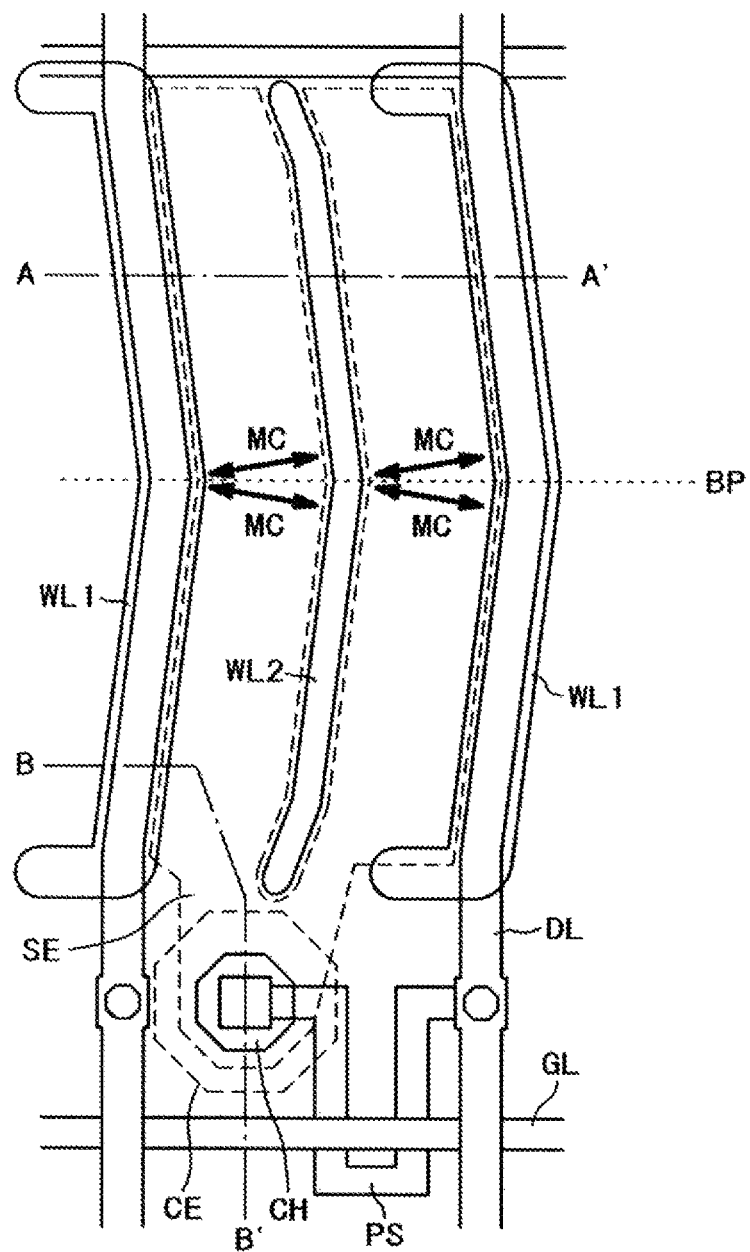
FIG. 9 is a plan view of Comparative example 1.
Figure 10:
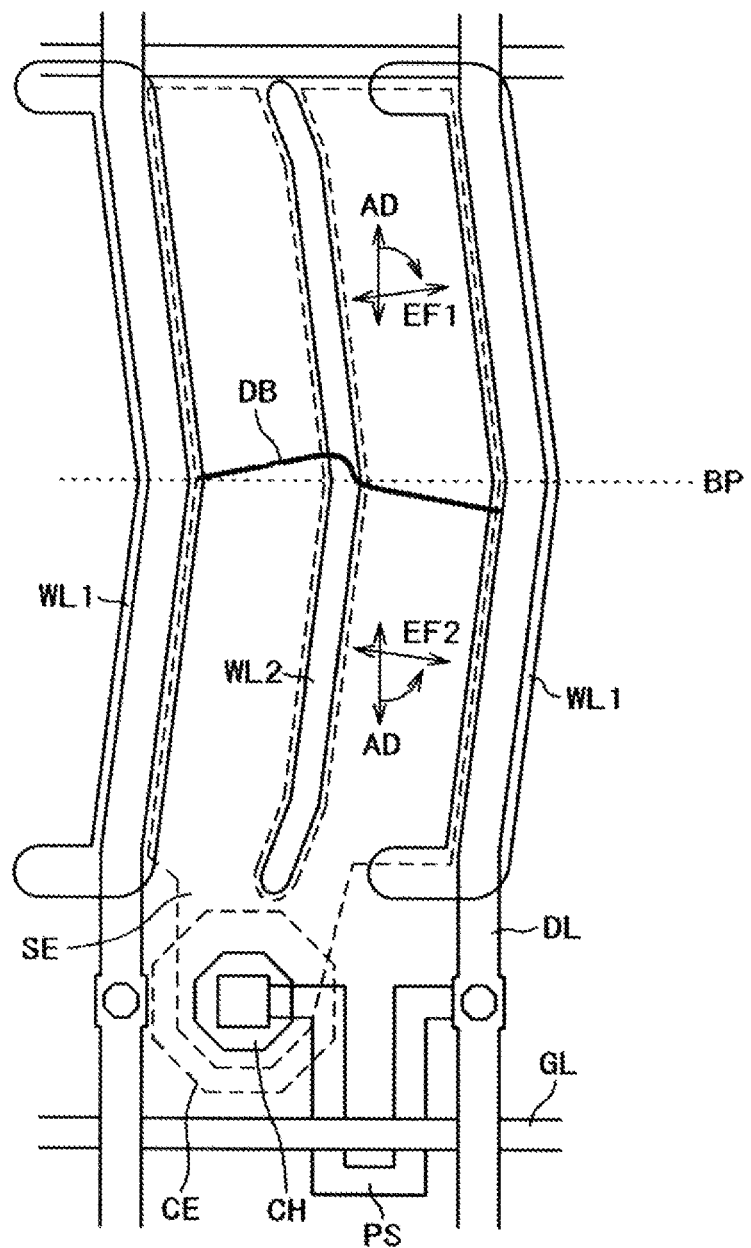
FIG. 10 is a plan view showing a state of domains of Comparative example 1.

As shown in the plan view of FIG. 9, the parallel portion PL and projection portions PJ have been removed from the bend portion BP, and the bend portion on the first wall structures WL1 and second wall structure WL2 has simple V-shaped structures. As a result, a distance between each first wall structure WL1 and second wall structure WL2 is longest in the center of the bend portion BP. The shortest portions MC are produced at two locations near the bend portion BP as shown in FIG. 9. Therefore, it is difficult to stabilize the domain boundary DB in the center of and near the bend portion BP. Thus, the position of the domain boundary DB is easily changed in response to an external stimulus such as a pressing force. FIG. 10 shows an example of a distribution of the domain boundary DB. The domain boundary DB is formed along the upper shortest portion MC shown in FIG. 9 between the left first wall structure WL1 and the second wall structure WL2. Between the right first wall structure WL1 and the second wall structure WL2, the domain boundary DB is formed along the lower shortest portion MC shown in FIG. 9. Two shortest portions MC are present between the left first wall structure WL1 and the second wall structure WL2 and between the right first wall structure WL1 and the second wall structure WL2, respectively. The domain boundary DB has four different distributions including one shown in FIG. 10. When a stronger pressing force is applied, the domain boundary DB moves greater as shown in FIG. 6B. The area ratio of the first domain DM1 and second domain DM2 deviates from a designed value. As a result, when viewed from the direction away from the normal direction, unevenness is observed.

As mentioned above, unless the portion MC where the distance between each first wall structure WL1 and the second wall structure WL2 is shortest is disposed to one location near the bend portion, the domain boundary DB becomes unstable. Accordingly, a pressing force on the liquid crystal display panel LCP causes unevenness therein easily.

Comparative Example 2

Figure 11:
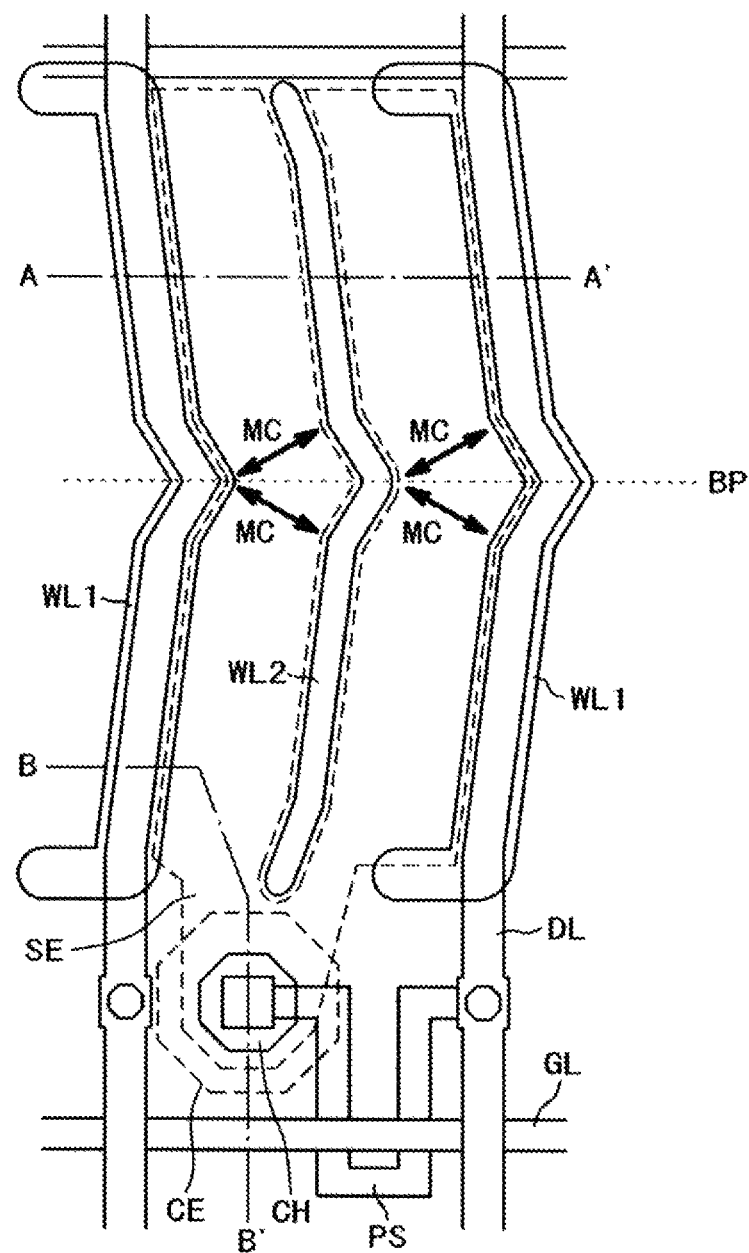
FIG. 11 is a plan, view of Comparative example 2.
Figure 12:
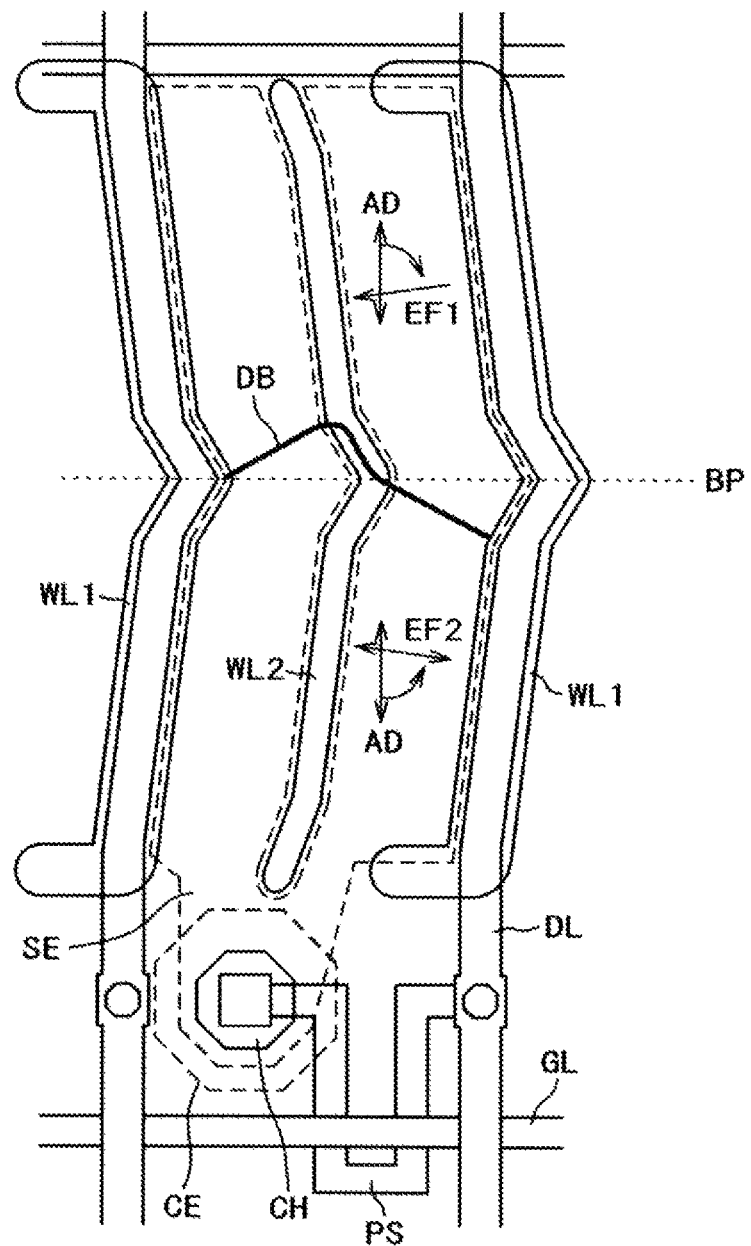
FIG. 12 is a plan view showing a state of domains of Comparative example 2.

As shown in FIG. 11, the bend portion on the first walls WL1 and second wall structure WL2 has a double V-shaped structure. Also in this case, the distance between each first wall structure WL1 and second wall structure WL2 is shortest in the center of the bend portion BP. Two shortest portions MC are formed to connect the bend of the left first wall structure WL1 to the double bend of the second wall structure WL2 as shown in FIG. 11. Two shortest portions MC are formed to connect the double bend of the right first wall structure WL1 to the bend of the second wall structure WL2. FIG. 12 shows an example of a distribution of the domain boundary DB. The domain boundary DB is formed along the upper shortest portion MC shown in FIG. 11 between the left first wall structure WL1 and the second wall structure WL2. The domain boundary DB is formed along the lower shortest portion MC shown in FIG. 11 between the right first wall structure WL1 and the second wall structure WL2. Also in this case, it is difficult for the domain boundary DB to be present stably in the center of and near the bend portion. Therefore, a position of the domain boundary DB is easily changed in response to an external stimulus such as a pressing force.

The double V-shaped structure is effective to stably form two domains in one pixel in the IPS mode using flat electrodes. However, the double V-shaped structure is ineffective in the wall electrode IPS-LCD using electrodes on wall structures because an electric field distribution is different between the wall electrode IPS-LCD and that IPS mode. Unless the portion MC where a distance between each first wall structure WL1 and the second wall structure WL2 is shortest is disposed to one location near the bend portion BP, the domain boundary DB is unstable. Accordingly, a pressing force on the liquid crystal display panel LCP causes unevenness therein easily.

Comparative Example 3

Figure 13:
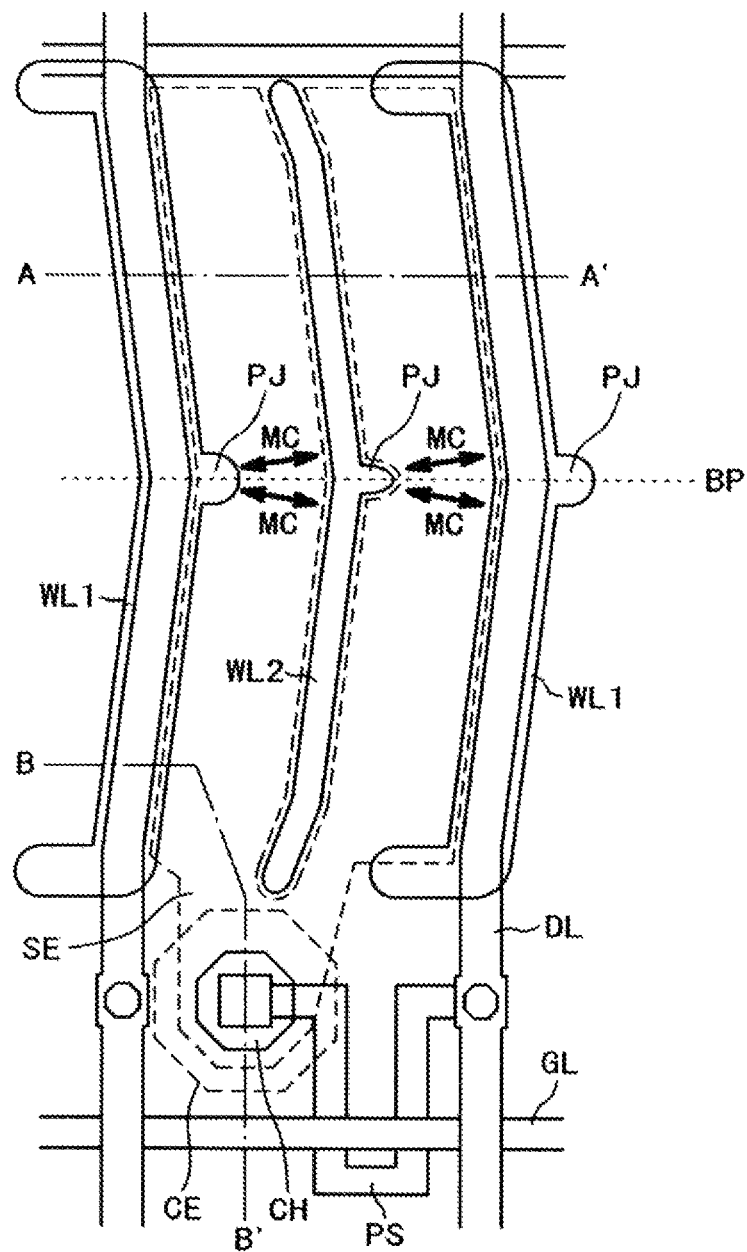
FIG. 13 is a plan view of Comparative example 3.
Figure 14:
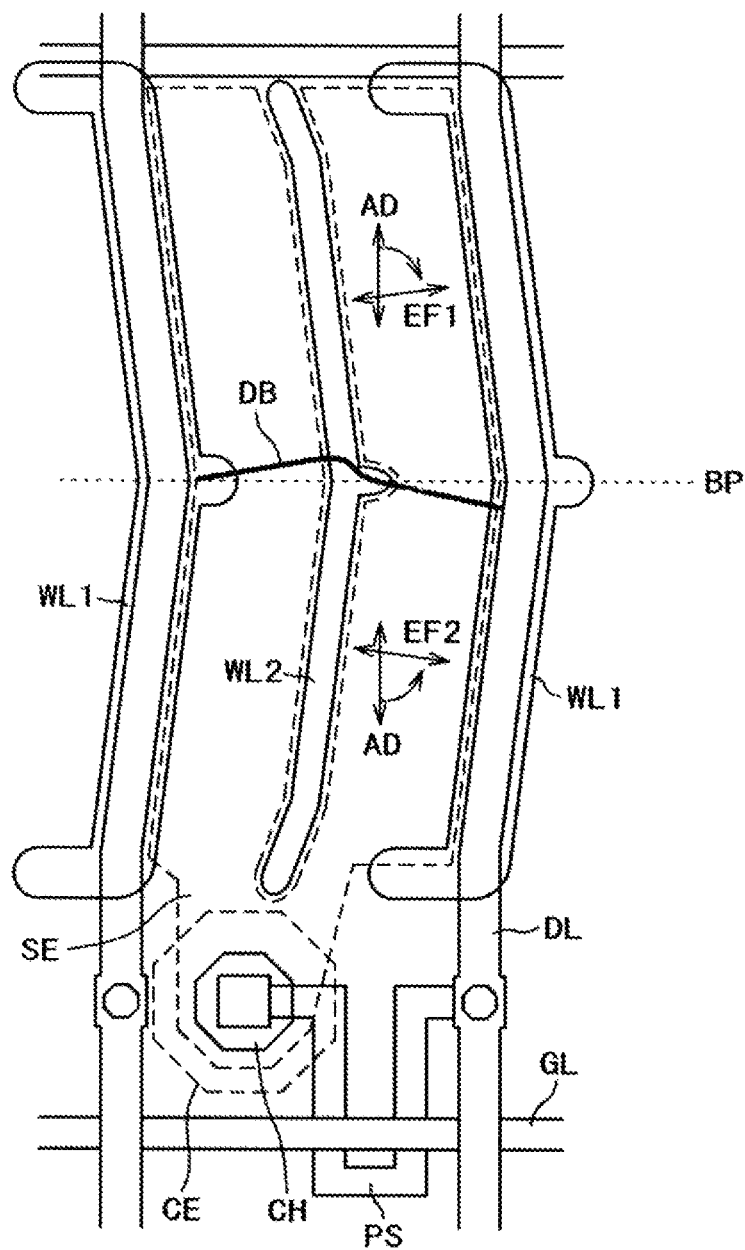
FIG. 14 is a plan view showing a state of domains of Comparative example 3.

As shown in FIG. 13, no parallel portion PL is prodded to the bend portion BP on the first wall structures WL1 and second wall structure WL2, bus only the projection portions PJ are provided thereto. As shown in FIG. 13, also in this case, the portions MC where the distance between each first wall structure WL1 and second wall structure WL2 is shortest are formed in two locations near the bend portion BP. The domain boundary DB is formed in one of the portions MC. The position of the domain boundary DB is easily changed to another portion MC in response to an external stimulus such as a pressing force. FIG. 14 shows one example of a distribution of the domain boundary DB. In this case, it is also difficult to dispose the portion MC where the distance between each first wall structure WL1 and second wall structure WL2 is shortest to one location near the bend portion. Therefore, the domain boundary DB is unstable. A pressing force on the liquid crystal display panel LCP causes unevenness therein easily.

Comparative Example 4

Figure 15:
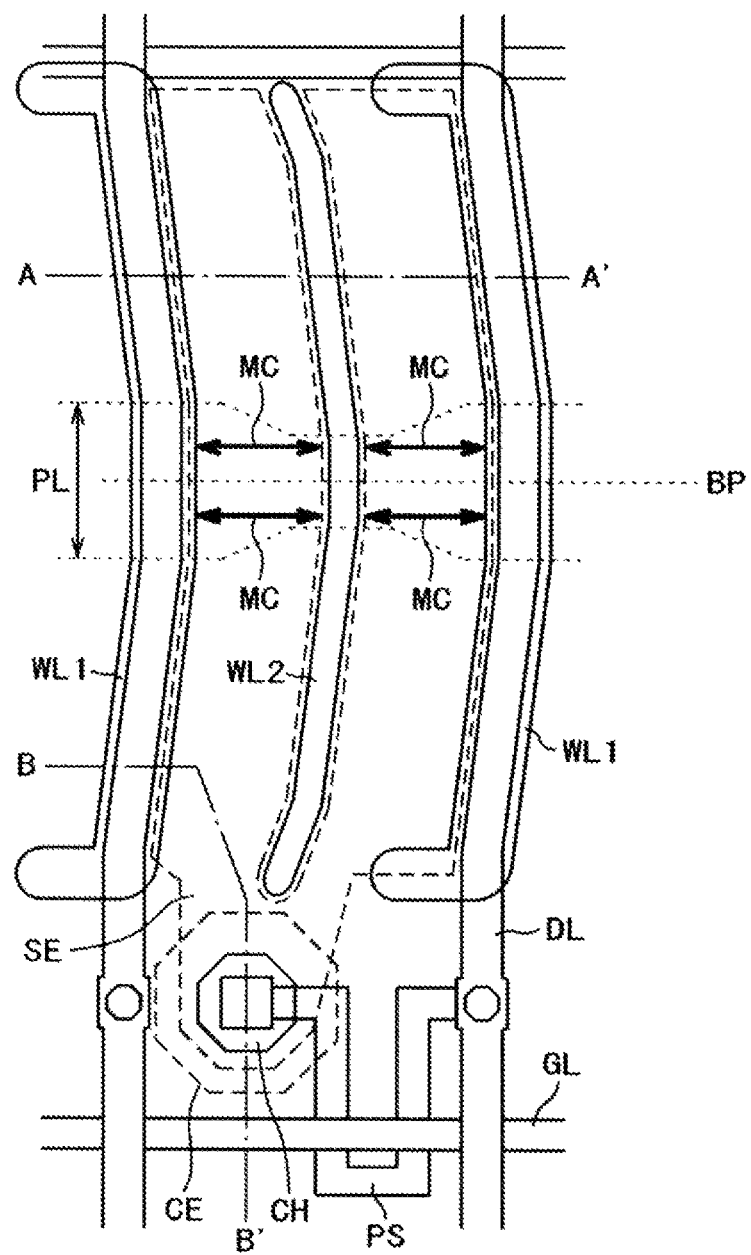
FIG. 15 is a plan view of Comparative example 4.
Figure 16:
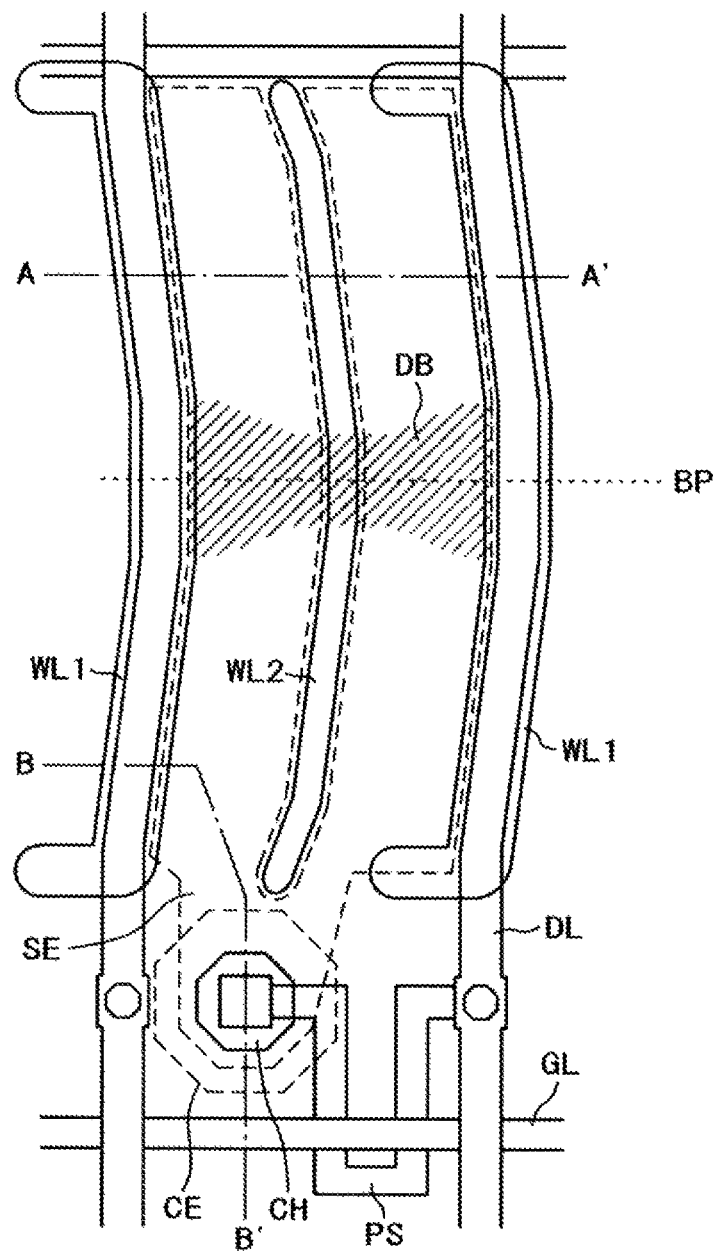
FIG. 16 is a plan view showing a state of domains of Comparative example 4.

As shown in FIG. 15, no projection portion PJ is formed to the bend portion BP on the first walls WL1 and second wall structure WL2, but only the parallel portion PL is provided therein. In this case, since the parallel portion PL on the first wall WL1 and the parallel portion PL on the second wall structure WL2 oppose each other, the portion MC where the distance between each first wall structure WL1 and second wall structure did is shortest is widely formed near the bend portion BP. Its upper end and lower end are shown by the thick line arrows in FIG. 15. The distribution of the domain boundary DB formed at this time is shown by the slashes in FIG. 16. The domain boundary DB is unstable, and thus a pressing force on the liquid crystal display panel LCP causes unevenness therein easily. In addition, the domain boundary DB became a dark line, which is widely distributed as shown in FIG. 16 to reduce the transmission.

What is claimed is:
1. A liquid crystal display device in which liquid crystal is sandwiched between a first substrate having a source electrode, a common electrode, a TFT, and a color filter and a second substrate, wherein a pixel of the first substrate is defined by an area surrounded by a video signal line extending in a first direction and a scanning signal line extending in a second direction, a first wall structure and a second wall structure are formed in the pixel oppositely to one another, a third wall structure is formed between the first wall structure and the second wall structure, the first wall structure and the second wall structure have a same height and are higher than the third wall structure, the first wall structure, the second wall structure, and the third wall structure are covered with the common electrode, the common electrode is covered with a first insulating film, a source electrode is formed on the first insulating layer on sides of the first wall structure, the second wall structure, and the third wall structure, the first wall structure has a first portion that intersects the first direction at a first angle θ, and a second portion that extends in a same direction as the first direction, and a third portion that intersects the first direction at a second angle (180 degrees−θ), the second portion has a first projection in a direction toward to the third wall structure, the third wall structure has a fourth portion that intersects the first direction at the first angle θ, a fifth portion that extends in a same direction as the first direction, and a sixth portion that intersects the first direction at the second angle (180 degrees−θ), the fifth portion has a second projection in a same direction as a projecting direction of the first projection, and a distance between the first projection and the fifth portion of the third wall structure is shorter than a distance between the second portion of the first wall structure except the first projection and the third wall structure.

2. The liquid crystal display device according to claim 1 wherein the second wall structure has a seventh portion that intersects the first direction at the first angle θ, an eighth portion in a same direction as the first direction, and a ninth portion that intersects the first direction at the second angle (180 degrees−θ), the eighth portion has a third projection in a same direction as the first projection, and a distance between the second projection and the eighth portion of the second wall structure is shorter than a distance between the fifth portion of the third wall structure except the second projection and the second wall structure.

3. The liquid crystal display device according to claim 2, wherein a maximum of a width of the first projection in the first wall structure in the first direction is smaller than a length of the second portion in the first wall structure, and a length of the second portion in the first wall structure is smaller than a distance between the second portion of the first wall structure except the first projection and the third wall structure.

4. The liquid crystal display device according to claim 3, wherein a maximum of a width of the second projection in the third wall structure in the first direction is smaller than a length of the fifth portion in the third wall structure, and a length of the fifth portion of the third wall structure is smaller than a distance between the fifth portion of the third wall structure except the second projection and the second wall structure.

5. The liquid crystal display device according to claim 4, wherein the first wall structure is present in a first end of the pixel, and the second wall structure is present in a second end of the pixel.

6. The liquid crystal display device according to claim 3, wherein the first wall structure is present in a first end of the pixel, and the second wall structure is present in a second end of the pixel.

7. The liquid crystal display device according to claim 2, wherein the first wall structure is present in a first end of the pixel, and the second wall structure is present in a second end of the pixel.

8. The liquid crystal display device according to claim 1, wherein the first wall structure is present in a first end of the pixel, and the second wall structure is present in a second end of the pixel.

* * * * *

UNITED STATES PATENT AND TRADEMARK OFFICE
CERTIFICATE OF CORRECTION

| | | |
|---|---|---|
| PATENT NO. | : 9,063,384 B2 | Page 1 of 1 |
| APPLICATION NO. | : 13/925709 | |
| DATED | : June 23, 2015 | |
| INVENTOR(S) | : Osamu Itou et al. | |

It is certified that error appears in the above-identified patent and that said Letters Patent is hereby corrected as shown below:

In the specification
Column 1, line 5, change "front" to --from--;
Column 2, line 23, change "stabilization m" to --stabilization in--;
Column 2, line 37, change "domain, boundary" to --domain boundary--;
Column 2, line 39, change "domain in boundary" to --domain boundary--;
Column 3, line 8, change "portion, that intersects" to --portion that intersects--;
Column 3, line 16, change "To the present invention" to --In the present invention--;
Column 3, line 27, change "snort" to --short--;
Column 3, line 56, change "plan, view" to --plan view--;
Column 3, line 67, change "nigh" to --high--;
Column 4, line 5, change "pixel, structure" to --pixel structure--;
Column 4, line 8, change "domain, boundary" to --domain boundary--;
Column 4, line 17, change "when, an acute" to --when an acute--;
Column 4, line 19, change "domain, boundary" to --domain boundary--;
Column 4, line 30, change "projection, is placed" to --projection is placed--;
Column 4, line 35, change "domain, boundary" to --domain boundary--;
Column 4, line 37, change "domain, boundary" to --domain boundary--;
Column 4, line 53, change "plan, view" to --plan view--;
Column 4, line 62, change "planar ration" to --planarization--;
Column 4, line 67, change "cocoon" to --common--;
Column 5, line 18, change "of she first wall" to --of the first wall--;
Column 5, line 28, change "polysilicon, layer" to --polysilicon layer--;
Column 5, line 35, change "to connect, the source" to --to connect the source--.

Signed and Sealed this
Fifth Day of April, 2016

Michelle K. Lee
*Director of the United States Patent and Trademark Office*

UNITED STATES PATENT AND TRADEMARK OFFICE
CERTIFICATE OF CORRECTION

PATENT NO. : 9,063,384 B2
APPLICATION NO. : 13/925709
DATED : June 23, 2015
INVENTOR(S) : Osamu Itou et al.

It is certified that error appears in the above-identified patent and that said Letters Patent is hereby corrected as shown below:

In the specification
Column 5, line 38, change "substantiality" to --substantially--;
Column 5, line 45, change "liquid crystal, director" to --liquid crystal director--;
Column 6, line 25, change "observed, when" to --observed. When--;
Column 6, line 48, change "is tensed" to --is formed--;
Column 6, line 55, change "wall, structures" to --wall structures--;
Column 6, lines 61-62, change "wall, structure" to --wall structure--;
Column 7, lines 3-4, change "domain boundary BB" to --domain boundary DB--;
Column 7, lines 14-15, change "panel, manipulations" to --panel manipulations--;
Column 7, lines 35-36, change "domain boundary DE is assumes" to --domain boundary DB is assumed--;
Column 7, line 49, change "DM1 more" to --DM1 move--;
Column 8, line 16, change "value, since" to --value. Since--;
Column 8, line 18, change "each, other" to --each other--;
Column 8, line 28, change "port ion" to --portion--;
Column 8, line 40, change "LCD" to --LCP--;
Column 9, line 4, change "between she parallel" to --between the parallel--;
Column 9, lines 5-6, change "second wall, structure" to --second wall structure--;
Column 10, line 25, change "prodded" to --provided--;
Column 10, line 27, change "bus only" to --but only--; and
Column 10, lines 52-53, change "second wall structure did" to --second wall structure WL2--.

Signed and Sealed this
Thirty-first Day of May, 2016

Michelle K. Lee
*Director of the United States Patent and Trademark Office*